(12) United States Patent
Ikeda et al.

(10) Patent No.: US 9,574,648 B2
(45) Date of Patent: Feb. 21, 2017

(54) ELECTRIC LINEAR ACTUATOR (71) Applicant: NTN Corporation, Osaka-shi (JP)

(72) Inventors: Yoshinori Ikeda, Iwata (JP); Kensuke Funada, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 14/461,367

(22) Filed: Aug. 16, 2014

(65) Prior Publication Data
US 2014/0352466 A1 Dec. 4, 2014

Related U.S. Application Data (63) Continuation of application No. PCT/JP2013/053554, filed on Feb. 14, 2013.

(30) Foreign Application Priority Data

Feb. 17, 2012 (JP) .................. 2012-032234

(51) Int. Cl.
*F16H 25/24* (2006.01)
*F16H 25/22* (2006.01)
*H02K 7/06* (2006.01)
*F16H 25/20* (2006.01)
*F16B 21/18* (2006.01)

(52) U.S. Cl.
CPC ...... *F16H 25/2204* (2013.01); *F16H 25/2214* (2013.01); *F16H 25/24* (2013.01); *H02K 7/06* (2013.01); *F16B 21/183* (2013.01); *F16H 2025/2081* (2013.01); *Y10T 74/18576* (2015.01)

(58) Field of Classification Search
CPC ...... F16H 25/20; F16H 25/22; F16H 25/2204; F16H 2025/204; F16H 2025/2081; F16B 21/183; F16B 21/186
USPC .............................. 74/89.23, 89.33
See application file for complete search history.

(56) References Cited

U.S. PATENT DOCUMENTS 2,487,802 A * 11/1949 Heimann ............. F16B 21/18 384/425
4,752,178 A * 6/1988 Greenhill ............. F16B 21/18 403/326

(Continued)

FOREIGN PATENT DOCUMENTS

JP 8-49782 2/1996
JP 8-324982 12/1996

(Continued)

*Primary Examiner* — David M Fenstermacher
(74) *Attorney, Agent, or Firm* — Harness, Dickey & Pierce, P.L.C.

(57) ABSTRACT

An electric linear actuator has a cylindrical housing, an electric motor, a speed reduction mechanism, and a ball screw mechanism. The ball screw mechanism has a nut and a screw shaft coaxially integrated with the drive shaft. The housing has receiving bores to receive the screw shaft. A cylindrical sleeve is securely press-fit into the receiving bore of the housing. The sleeve has one pair of axially extending recessed grooves formed on its inner circumference at diametrically opposed positions. A guide pin, mounted on the end of the screw shaft, engages the recessed grooves. An annular groove is formed near an opening of the receiving bore of the housing. The sleeve is held in the receiving bore by a stopper ring snapped into the annular groove.

8 Claims, 5 Drawing Sheets

(56) References Cited

U.S. PATENT DOCUMENTS

| | | | | |
|---|---|---|---|---|
| 5,046,376 A | * | 9/1991 | Baker | F16K 31/1221 251/14 |
| 5,784,922 A | | 7/1998 | Ozaki et al. | |
| 5,899,114 A | * | 5/1999 | Dolata | F16H 25/2204 74/424.85 |
| 6,619,147 B1 | * | 9/2003 | Kojima | F16H 25/20 74/89.23 |
| 7,073,406 B2 | * | 7/2006 | Garrec | F16H 25/20 74/89.34 |
| 2002/0043880 A1 | * | 4/2002 | Suzuki | H02K 7/06 310/12.14 |
| 2006/0257230 A1 | | 11/2006 | Tanaka et al. | |
| 2009/0247365 A1 | * | 10/2009 | Di Stefano | B60T 13/02 477/197 |
| 2010/0139429 A1 | * | 6/2010 | Ku | B66F 3/08 74/89.37 |
| 2010/0178004 A1 | * | 7/2010 | Tsujimoto | F16C 19/386 384/564 |
| 2010/0319477 A1 | * | 12/2010 | Tateishi | F16H 25/2454 74/411.5 |
| 2011/0265588 A1 | * | 11/2011 | Schlecht | F16H 25/20 74/89.32 |
| 2012/0247240 A1 | * | 10/2012 | Kawahara | F16H 25/20 74/89.23 |
| 2013/0112022 A1 | * | 5/2013 | Shimizu | F16H 25/20 74/89.34 |

FOREIGN PATENT DOCUMENTS

| | | | | |
|---|---|---|---|---|
| JP | 10-331836 | | 12/1998 | |
| JP | 2005-291480 | | 10/2005 | |
| JP | 2006-316923 | | 11/2006 | |
| JP | 2007-333046 | | 12/2007 | |
| JP | 2010-286083 | | 12/2010 | |
| JP | WO 2011135849 A1 | * | 11/2011 | F16H 25/20 |
| JP | 2012-021609 | | 2/2012 | |

\* cited by examiner

ELECTRIC LINEAR ACTUATOR

CROSS-REFERENCE TO RELATED APPLICATIONS

This application is a continuation of International Application No. PCT/JP2013/053554, filed Feb. 14, 2013, which claims priority to Japanese Application No. 2012-032234, filed Feb. 17, 2012. The disclosures of the above applications are incorporating herein by reference.

FIELD

The present disclosure relates to an electric linear actuator with a ball screw mechanism used in electric motors in general industries and driving sections of automobiles etc. and, more particularly, to an electric linear actuator used in a transmission or a parking brake to convert rotary motion from an electric motor to linear motion of a drive shaft, via a ball screw mechanism.

BACKGROUND

Gear mechanisms, such as a trapezoidal threaded worm gear mechanism or a rack and pinion gear mechanism as a mechanism, have been used in various kinds of driving sections to convert a rotary motion of an electric motor to an axial linear motion in an electric linear actuator. These motion converting mechanisms involve sliding contact portions. Thus, power loss is increased and this requires an increase in the size of the electric motors and the power consumption. Accordingly, the ball screw mechanisms have been widely adopted as more efficient actuators.

In an electric linear actuator of the prior art, an output member, connected to a nut, can be axially displaced by rotationally driving a ball screw shaft, forming a ball screw, with the use of an electric motor supported on a housing. Since friction of the ball screw mechanism is very low, the ball screw shaft tends to be easily reversely rotated when a pushing thrust load is applied to the output member. Accordingly, it is necessary to hold the position of the output member when the electric motor is stopped.

Figure 7:
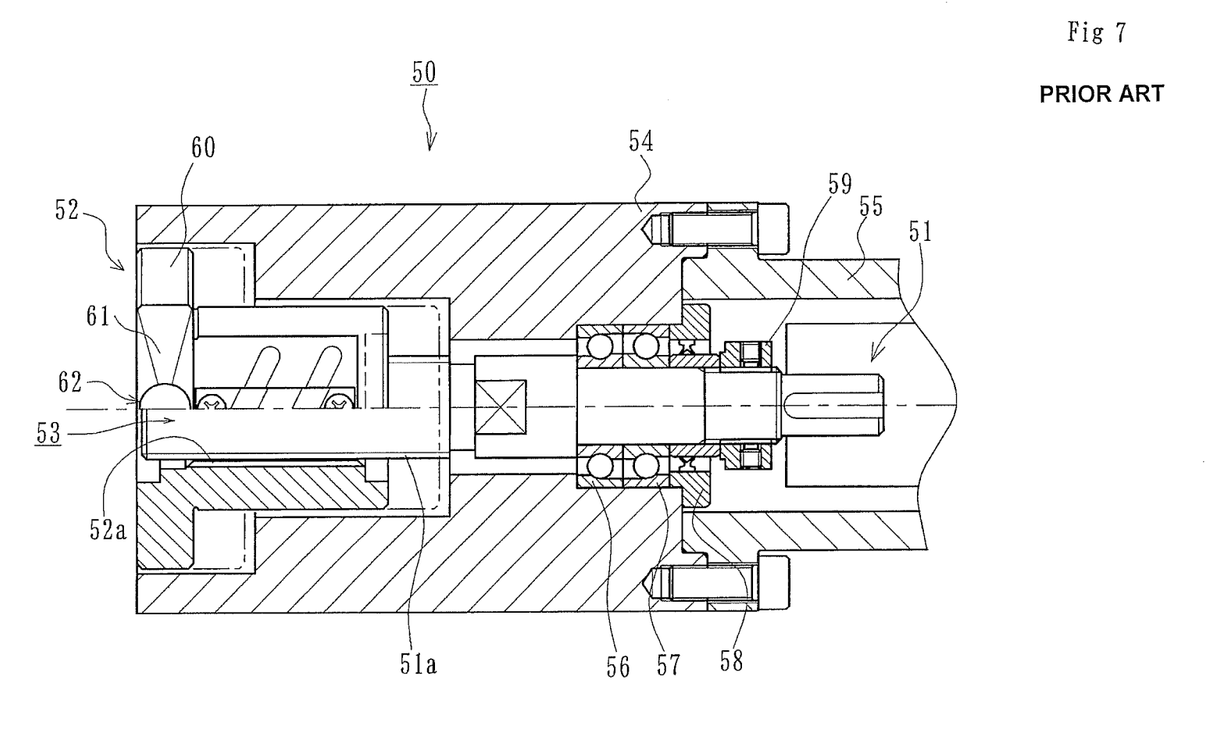
FIG. 7 is a longitudinal section view of a prior art electric linear actuator.

Accordingly, an electric linear actuator has been developed where a brake mechanism is arranged for an electric motor or a low efficient mechanism such as a worm gear is provided as a power transmitting mechanism. FIG. 7 illustrates one representative example. It includes a ball screw mechanism 53 with a ball screw shaft 51 rotationally driven by an electric motor (not shown). A ball screw nut 52 engages the ball screw shaft 51, via balls (not shown). When a motor shaft (not shown) of the electric motor is rotated, the ball screw shaft 51 connected to the motor shaft is rotated. This moves the ball screw nut 52 in a linear motion (left and right direction in FIG. 7).

The ball screw shaft 51 is rotationally supported on cylindrical housings 54, 55 via two rolling bearings 56, 57. These rolling bearings 56, 57 are secured by a rotation preventing member 59 to prevent loss of the bearings 56, 57, via a securing lid 58.

The ball screw shaft 51 is formed on its outer circumference with a helical screw groove 51a. The groove 51a engages a cylindrical ball screw nut 52 via balls. The ball screw nut 52 is formed on its inner circumference with helical screw groove 52a. The nut 52 has a larger diameter portion 60 on its end.

A side surface of the larger diameter portion 60 is formed with a flat portion 61 cut out. The cut out has a flat end face. A cam follower (rotation preventing means) 62 projects radially outward from a substantially central portion of the flat portion 61.

Since the cam follower 62 is fit in the cut-out portion, the ball screw nut 52 is not able to rotate along with the rotation of the ball screw shaft 51. In addition, since the cam follower 62 rotationally slides against the cut-out portion, it is possible to reduce problems with sliding friction and wear of the housing (see e.g. Patent Document 1, JP2007-333046 A).

In the prior art electric linear actuator 50, the use of the cam follower 62 as a ball screw nut 52 rotation preventing mechanism makes it possible to reduce problems with sliding friction and wear of the housing of the actuator. However, since the cam follower 62 itself uses a rolling bearing, it is believed that the manufacturing cost of the electric linear actuator will be increased. In addition, any anti-wear mechanism will be required when the housing is made of aluminum material.

SUMMARY

It is, therefore, an object of the present disclosure to provide an electric linear actuator that can reduce the sliding friction and wear of the housing of the electric linear actuator. Also, the present disclosure reduces the manufacturing cost due to its simple structure.

To achieve the object of the present disclosure, an electric linear actuator comprises a cylindrical housing formed of light aluminum alloy. An electric motor is mounted on the housing. A speed reduction mechanism reduces the rotational speed of the electric motor, via a motor shaft. A ball screw mechanism converts the rotational motion of the electric motor to an axial linear motion of a driving shaft, via the speed reduction mechanism. The ball screw mechanism comprises a nut formed with a helical screw groove on its inner circumference. The nut is rotationally supported on the housing by a pair of support bearings. The nut, however, is axially immovably. A screw shaft is coaxially integrated with the drive shaft. The screw shaft is formed with a helical screw groove on its outer circumference that corresponds to the helical screw groove of the nut. The screw shaft is adapted to be inserted into the nut, via a large number of balls. The screw shaft is non-rotationally supported on the housing. However, the screw shaft is axially movable. The housing is formed with receiving bores to receive the screw shaft. A cylindrical sleeve is securely press-fit into the receiving bore of the housing. The sleeve is formed on its inner circumference, at diametrically opposed positions, with one pair of axially extending recessed grooves. A guide pin, mounted on the end of the screw shaft, engages the recessed grooves. An annular groove is formed near an opening of the receiving bore of the housing. The sleeve is fixably held in the receiving bore by a pressing stopper ring snapped in the annular groove.

The electric linear actuator of the present disclosure comprises a cylindrical housing formed of light aluminum alloy. An electric motor is mounted on the housing. A speed reduction mechanism reduces the rotational speed of the electric motor, via a motor shaft. A ball screw mechanism converts the rotational motion of the electric motor to an axial linear motion of a driving shaft, via the speed reduction mechanism. The ball screw mechanism comprises a nut formed with a helical screw groove on its inner circumference. The nut is rotationally supported by a pair of support bearings mounted on the housing. The nut is axially immovable. A screw shaft is coaxially integrated with the drive shaft. The screw shaft is formed with a helical screw groove on its outer circumference that corresponds to the helical screw groove of the nut. The screw shaft is adapted to insert into the nut, via a large number of balls. The screw shaft is non-rotationally supported on the housing but is axially movable. The housing is formed with receiving bores to receive the screw shaft. A cylindrical sleeve is securely press-fit into the receiving bore of the housing. The sleeve is formed on its inner circumference, at diametrically opposed positions, with one pair of axially extending recessed grooves. A guide pin, mounted on the end of the screw shaft, engages the grooves. An annular groove is formed near an opening of the receiving bore of the housing. The sleeve is fixably held in the receiving bore by a stopper ring snapped in the annular groove. Thus, it is possible to provide an electric linear actuator that can reduce the sliding friction and wear of the housing of the electric linear actuator. Also, the electric linear actuator reduces the manufacturing cost due to its simple structure.

The stopper ring is formed with bent portions. Each bent portion has at least one vertex positioned symmetrically around a cut-out portion of the stopper ring. This makes it possible to apply a predetermined pre-pressure to the sleeve by an axial load due to spring force of the stopper ring. Thus, this surely prevents generation of wear, sound or vibration of the housing.

The width of the annular groove is set smaller than the free height of the stopper ring. This makes it possible to compress the stopper ring when it is mounted in the annular groove. Thus, the stopper ring generates axial load to be applied to the sleeve.

At least the radially outermost corner edges of the stopper ring are rounded. This makes it possible for the stopper ring to scrape the inner circumference of the housing. Thus, this improves the reliability of the actuator while preventing the generation of debris that would cause troubles to the actuator.

The stopper ring is formed by press working of wire material so that corner edges are previously rounded. This makes it possible to omit post treatment of the stopper ring. Thus, this improves its productivity.

The sleeve is formed of sintered alloy so that quenching by carburization is possible. This makes it possible to easily form an accurate sleeve with desired configuration and dimension even though it requires high manufacturing technology or has a complicated configuration.

The housing is formed by aluminum die casting. This makes it possible to have high productivity and low manufacturing cost.

The guide pin is formed from a needle roller used for needle roller bearings. This makes it possible to have guide pins with excellent wear resistance and shearing strength. Also, the needles are readily available and thus this reduces the manufacturing cost. In addition, since the ends of needle rollers are crowned, it is possible to prevent the generation of edge loads at the contacting points of the recessed grooves of the sleeve. Thus, this reduces the contact-surface pressure and improves the durability of the actuator for a long term.

The electric linear actuator of the present disclosure comprises a cylindrical housing formed of light aluminum alloy. An electric motor is mounted on the housing. A speed reduction mechanism reduces the rotational speed of the electric motor, via a motor shaft. A ball screw mechanism converts the rotational motion of the electric motor to an axial linear motion of a driving shaft, via the speed reduction mechanism. The ball screw mechanism comprises a nut formed with a helical screw groove on its inner circumference. The nut is rotationally supported by a pair of support bearings mounted on the housing. The nut is axially immovable. A screw shaft is coaxially integrated with the drive shaft. The screw shaft is formed with helical screw groove on its outer circumference that corresponds to the helical screw groove of the nut. The screw shaft is adapted to be inserted into the nut via a large number of balls. The screw shaft is non-rotationally supported on the housing. The screw shaft is axially movable. The housing is formed with receiving bores to receive the screw shaft. A cylindrical sleeve is securely press-fit into the receiving bore of the housing. The sleeve is formed on its inner circumference, at diametrically opposed positions, with one pair of axially extending recessed grooves. A guide pin mounted on the end of the screw shaft engages the grooves. An annular groove is formed near an opening of the receiving bore of the housing. The sleeve is fixably held in the receiving bore by a stopper ring snapped in the annular groove. Thus, it is possible to provide an electric linear actuator that can reduce the sliding friction and wear of the housing of the electric linear actuator. Also, the electric linear actuator reduces the manufacturing cost due to its simple structure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

One mode for carrying out the present disclosure is an electric linear actuator that comprises a cylindrical housing formed of light aluminum alloy. An electric motor is mounted on the housing. A speed reduction mechanism reduces the rotational speed of the electric motor, via a motor shaft. A ball screw mechanism converts the rotational motion of the electric motor to an axial linear motion of a driving shaft, via the speed reduction mechanism. The ball screw mechanism comprises a nut formed with a helical screw groove on its inner circumference. The nut is rotationally supported by a pair of support bearings mounted on the housing. The nut is axially immovable. A screw shaft is coaxially integrated with the drive shaft. The screw shaft is formed with a helical screw groove on its outer circumference that corresponds to the helical screw groove of the nut. The screw shaft is adapted to be inserted into the nut, via a large number of balls. The screw shaft is non-rotationally supported on the housing. The screw shaft is axially movable. The housing is formed with receiving bores to receive the screw shaft. A cylindrical sleeve is securely press-fit into the receiving bore of the housing. The sleeve is formed on its inner circumference, at diametrically opposed positions, with one pair of axially extending recessed grooves. A guide pin mounted on the end of the screw shaft engages the grooves. An annular groove is formed near an opening of the receiving bore of the housing. The sleeve is fixably held in the receiving bore by a stopper ring snapped in the annular groove. The stopper ring is formed with a bent portion with at least one vertex at positions symmetric around a cut-out portion of the stopper ring.

An embodiment of the present disclosure will be hereinafter described with reference to the drawings.

Figure 1:
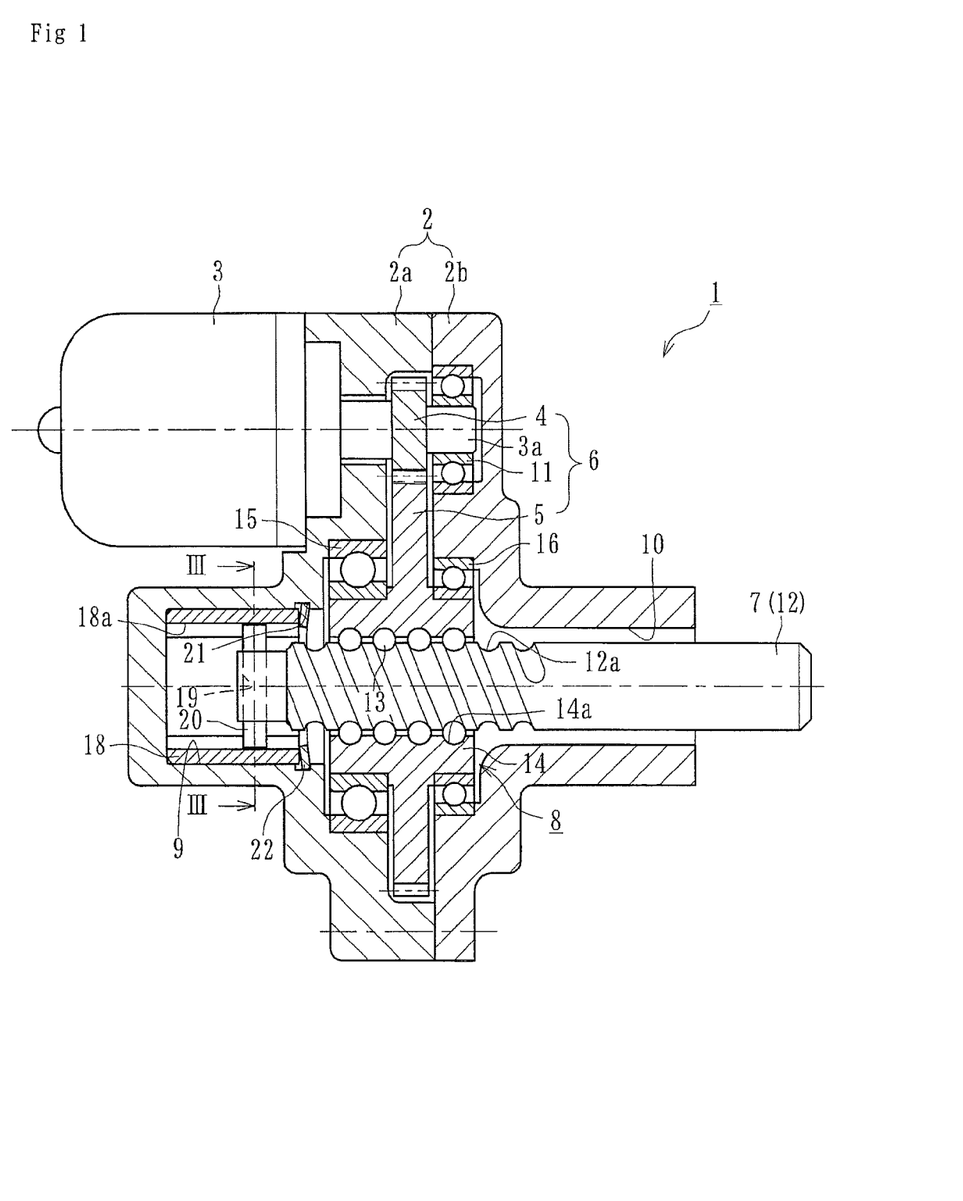
FIG. 1 is a longitudinal section view of one preferable embodiment of an electric linear actuator.
Figure 2:
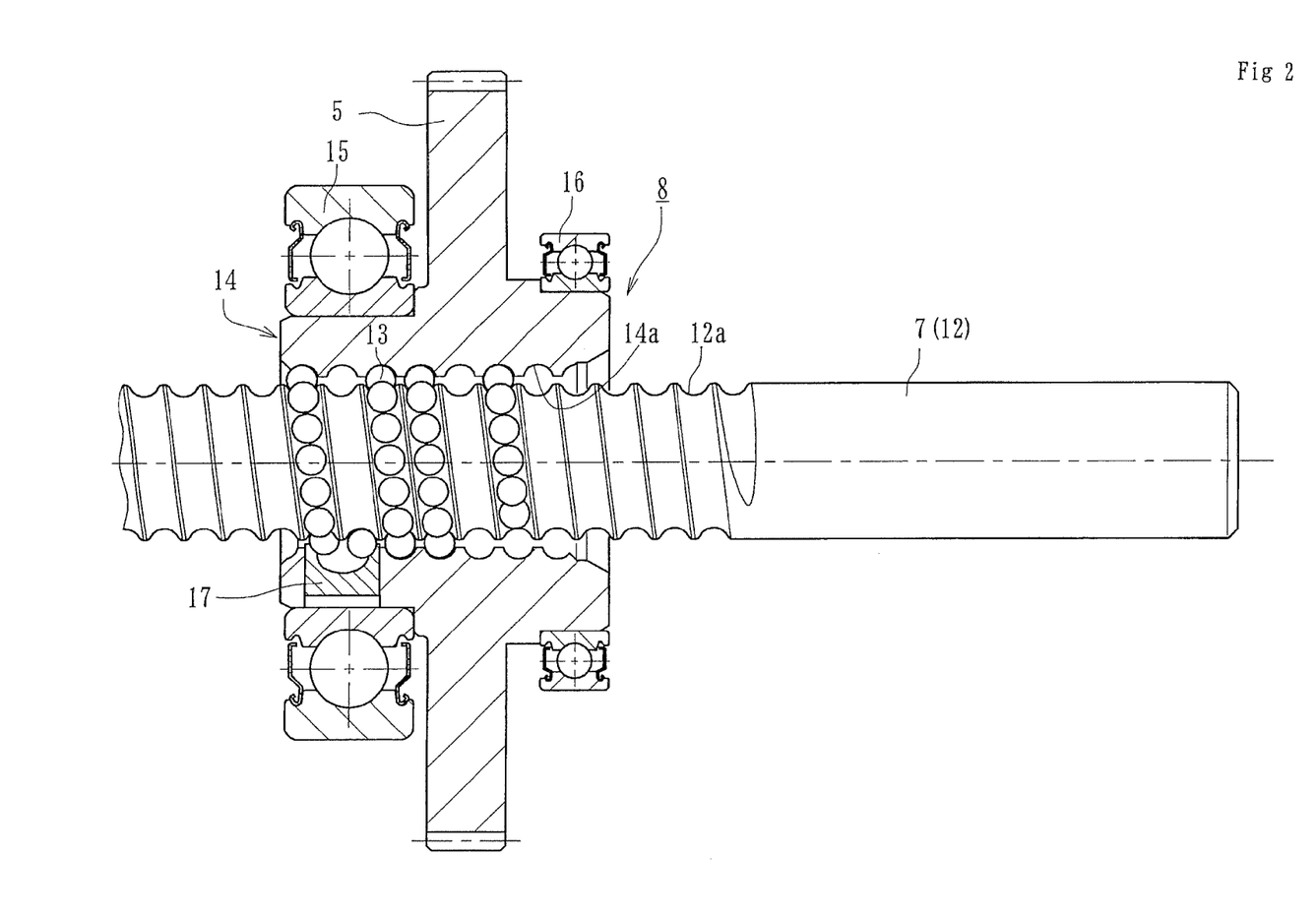
FIG. 2 is a longitudinal section view of a ball screw mechanism of the electric linear actuator of FIG. 1.
Figure 3:
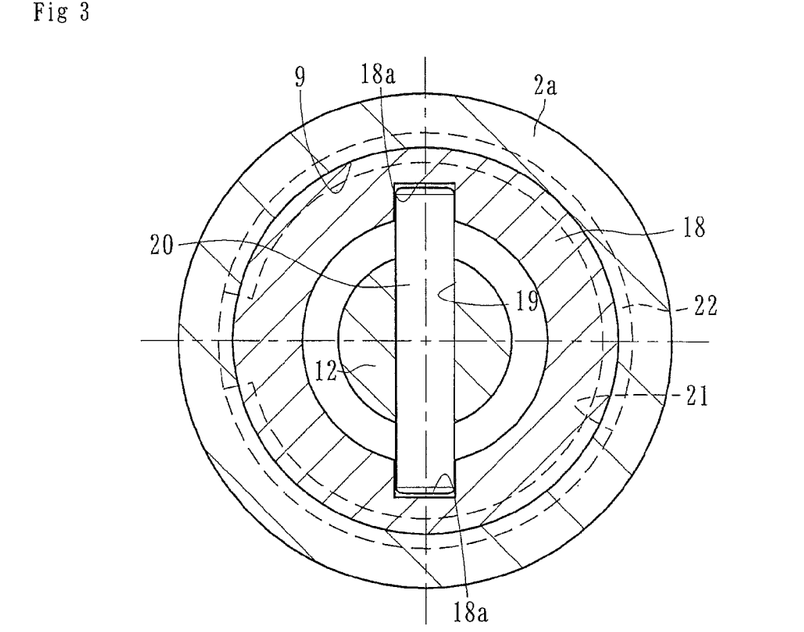
FIG. 3 is a cross-section view taken along a line of FIG. 1.
Figure 4:
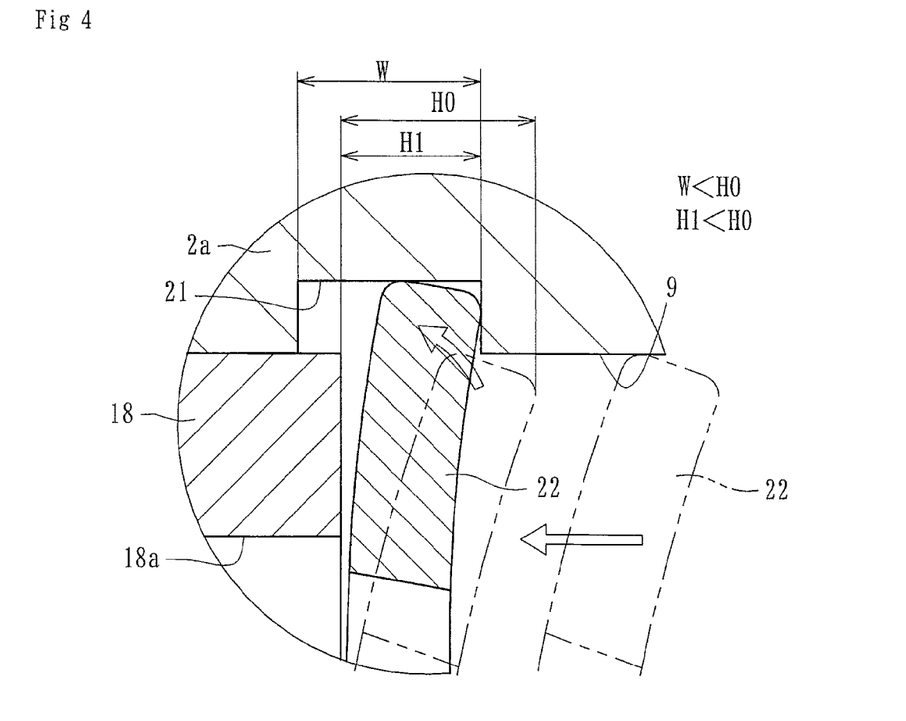
FIG. 4 is a partially enlarged view of a mounting portion of a stopper ring.
Figure 5:
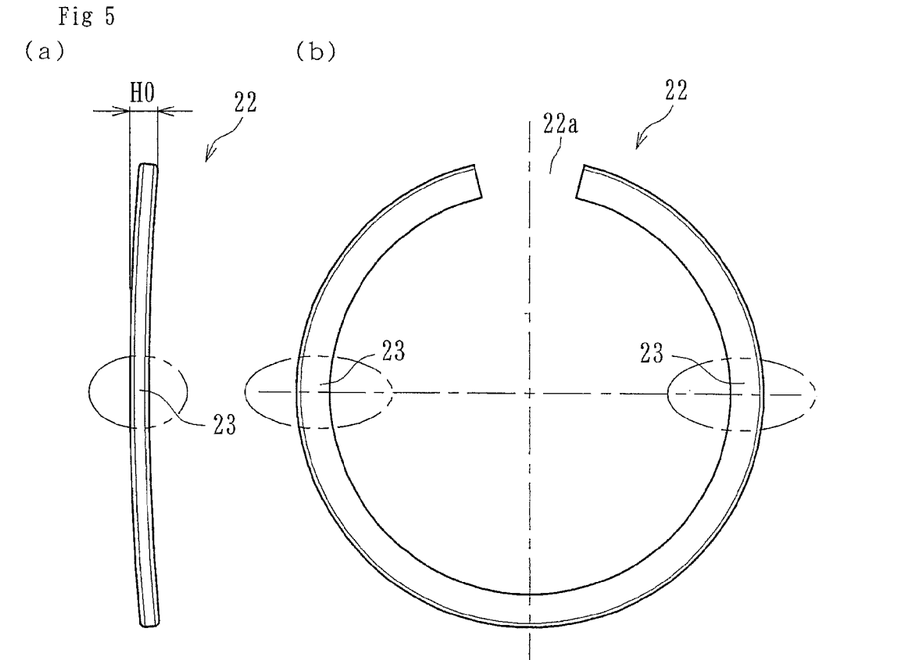
FIG. 5(a) is a side elevation view of a stopper ring.
FIG. 5(b) is a front elevation view of FIG. 5(a).
Figure 6:
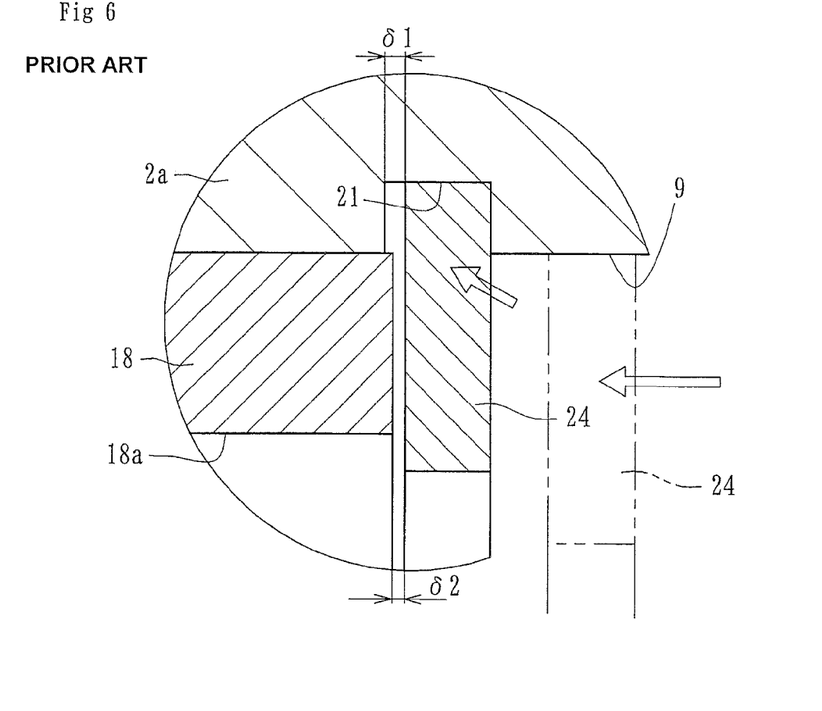
FIG. 6 is an explanatory view of a mounting portion of a prior art stopper ring.

FIG. 1 is a longitudinal section view of a preferable embodiment of an electric linear actuator. FIG. 2 is a longitudinal section view of a ball screw mechanism of the electric linear actuator of FIG. 1. FIG. 3 is a cross-section view taken along a line of FIG. 1. FIG. 4 is a partially enlarged view of a mounting portion of a stopper ring. FIG. 5(a) is a side elevation view of a stopper ring. FIG. 5(b) is a front elevation view of FIG. 5(a). FIG. 6 is an explanatory view of a mounting portion of a prior art stopper ring.

As shown in FIG. 1, an electric linear actuator 1 includes a cylindrical housing 2, an electric motor 3, a speed reduction mechanism, and a ball screw mechanism 8. The electric motor is mounted on the housing 2. The speed reduction mechanism 6 includes a pair of spur gears 4, 5 to reduce the rotational speed of the electric motor 3, via its motor shaft 3a. The ball screw mechanism 8 converts the rotational motion of the electric motor 3 to an axial linear motion of a drive shaft 7, via the speed reduction mechanism 6.

The housing 2 is formed of aluminum alloy such as A6063TE, ADC12 etc. The housing 2 includes a first housing 2a and second housing 2b. The first and second housing 2a, 2b abuts against the end face of one another and are integrally secured onto each other by fastening bolts (not shown). The electric motor 3 is mounted on the first housing 2a. The first and second housings 2a, 2b are formed, respectively, with a receiving bore (blind bore) 9 and a receiving bore (through bore) 10 to receive a screw shaft 12.

The motor shaft 3a of the electric motor 3 includes the smaller spur gear 4. The smaller spur gear is non-rotatably fixed to the motor shaft 3a. The motor shaft 3a is rotationally supported by a rolling bearing 11 mounted on the second housing 2b. The larger spur gear 5 is integrally formed with a nut 14. The nut 14 forms the ball screw mechanism later mentioned more in detail. The larger spur gear 5 engages with the smaller spur gear 4. The drive shaft 7 is coaxially and integrally formed with the screw shaft 12.

As shown in the enlarged view of FIG. 2, the ball screw mechanism 8 includes the screw shaft 12 and the nut 14. The nut 14 is externally mounted on the screw shaft 12, via balls 13. The screw shaft 12 is formed with a helical screw groove 12a on its outer circumference. The screw shaft 12 is axially movable. The nut 14 is formed, on its inner circumference, with a helical screw groove 14a that corresponds to the helical screw groove 12a of the screw shaft 12. A number of balls 13 are freely rollably contained between the screw grooves 12a, 14a. The nut 14 is rotationally supported by a pair of supporting bearings 15, 16 mounted on the housing 2. The nut is axially immovable. A reference numeral 17 denotes a bridge member that connects the screw grooves 14a of the nut 14 and endlessly circulating the balls 13.

The cross-sectional configuration of each screw groove 12a, 14a may be either a circular-arc or a Gothic-arc configuration. However, this embodiment adopts the Gothic-arc configuration. It can have a large contacting angle with the ball 13 and a small axial gap. This provides a large rigidity against the axial load and suppresses the generation of vibration.

The nut 14 is formed of case hardened steel such as SCM415 or SCM420. Its surface is hardened to HRC 55~62 by vacuum carburizing hardening. This enables the omission of treatments such as buffing for scale removal after heat treatment. Thus, this reduces the manufacturing cost. The screw shaft 12 is formed of medium carbon steel such as S55C or case hardened steel such as SCM415 or SCM420. Its surface is hardened to HRC 55~62 by induction hardening or carburizing hardening.

The larger spur gear 5 is integrally formed on the outer circumference of the nut 14. Two support bearings 15, 16 are press-fit onto the larger spur gear 5 via a predetermined interface. This makes it possible to prevent the generation of axial positional displacement between the support bearings 15, 16 and the larger spur gear 5 even though a thrust load would be applied to them from the drive shaft 7. In addition, each of the support bearings 15, 16 is a sealed deep groove ball bearing. Shield plates are arranged on either side of the support bearings to prevent leakage of lubricating grease sealed in the bearings. Also, the shield plates prevent the penetration of worn powder or debris into the bearings from the outside.

According to the present disclosure, a cylindrical sleeve 18 is fit into the receiving bore (blind bore) 9 of the first housing 2a. The sleeve 18 is formed from sintered alloy by an injection molding machine for molding plastically prepared metallic powder. In this injection molding, metallic powder and a binder including plastics and wax are first mixed and kneaded by a mixing and kneading machine to form pellets from the mixed and kneaded material. The pellets are formed into articles (sleeves) by a so-called MIM (Metal Injection Molding) method. Here, pellets are fed into a hopper of the injection molding machine. The pellets enter into molds under a heated and melted condition. The MIM method can easily mold sintered alloy material into articles with desirable accurate configurations and dimensions even though the articles require high manufacturing technology and have hard to form configurations.

One example of a metallic powder, such as SCM415, that can be carburization quenched later, comprises compositions of C: 0.13% by weight, Ni: 0.21% by weight, Cr: 1.1% by weight, Cu: 0.04% by weight, Mn: 0.76% by weight, Mo: 0.19% by weight, Si: 0.20% by weight, and remainder: Fe. The sleeve 18 is formed by controlling the temperatures of carburization quenching and tempering. Other materials can be used for the sleeve 18, such as FEN8 of Japanese powder metallurgy industry standard, which has excellent formability and rust resistance. It includes Ni: 3.0~10.0% by weight or precipitation hardening stainless steel SUS630 consisting of C: 0.07% by weight, Cr: 17% by weight, Ni: 4% by weight, Cu: 4% by weight, and remainder: Fe. The surface hardness of SUS630 can be increased within a range of 20~33 HRC by solution treatment to obtain both high toughness and hardness. With the use of such sintering material to form the sleeve 18, it is possible to increase the strength and wear resistance of the sleeve higher than those of the first housing 2a, formed of aluminum alloy, and thus to improve the durability of the electric linear actuator.

As shown in FIG. 3, the sleeve 18 is formed with one pair of axially extending recessed grooves 18a on the inner circumference of the sleeve 18. The recessed grooves 18a diametrically oppose one another.

The end of the screw shaft 12 is formed with a radially extending through aperture 19. A guide pin 20 is fit into the aperture 19. An annular groove 21 is formed near an opening of the receiving bore 9. A stopper ring 22 is snapped into the annular groove 21 to secure the axial position of the sleeve 18 (see FIG. 1).

The guide pin 20 is fit through the aperture 19. The guide pin 20 engages with the recessed groove 18a of the sleeve 18. The guide pin 20 axially guides the screw shaft 12 and its stop rotation. The guide pin 20 and the sleeve 18 cooperate and constitute a rotation stopping mechanism for the screw shaft 12.

A needle roller for a needle roller bearings is used as the guide pin 20. The needle rollers exhibit excellent wear resistance and shearing strength. Also, needle rollers are readily available and thus reduce the manufacturing cost. In addition, the ends of needle rollers are crowned. Thus, it is possible to prevent the generation of edge load in contacting points with the recessed grooves 18a of the sleeve 18. Thus, this reduces the contact-surface pressure and improves the durability of the actuator for a long term.

According to the disclosure, the axial guide and rotation prevention function of the screw shaft 12 are performed by engagement of the guide pin 20 with the recessed groove 18a of the sleeve 18. Thus, it is possible to provide an electric linear actuator that can reduce the sliding friction and wear on the housing 2a, formed of light aluminum alloy, as well as reduce manufacturing cost due to its simple structure.

As shown in an enlarged view of FIG. 4, a stopper ring 22 is snapped into an annular groove 21 formed on the inner circumference of the receiving bore 9. This prevents the sleeve 18 from being axially moved due to interfere of the stopper ring 22 with the sleeve 18. The stopper ring 22 is preferably formed of hard steel wire material such as SWRH67A (JIS G3506). As shown in FIG. 5, the stopper ring 22 is different from a conventional flat "C"-shaped snap ring. The stopper ring 22 is formed with bent portions 23 having at least one vertex at positions symmetric around a cut-out portion 22a of the stopper ring 22.

The stopper ring 22 may be press-formed for example of austenitic stainless steel sheet (e.g. MS SUS304 etc.) or preserved cold rolled steel sheet (e.g. JIS SPCC etc.) other than the previously described material.

As comparatively shown in FIG. 6, it is believed that a prior art stopper ring 24 would be caused an axial gap δ1 between annular groove 21 and the stopper ring 24 or an axial gap δ2 between the stopper ring 24 and the sleeve 18. Accordingly, this causes wear in the receiving bore 9 and noise or vibration of the sleeve 18 or stopper ring 24. Further, in the prior art stopper ring 24, it is believed that the stopper ring 24 would scrape the inner circumference of the receiving bore 9 during insertion of the stopper ring into the receiving bore 9 under a radially compressed condition. The scraped debris would cause various troubles to the electric linear actuator.

On the contrary according to the present disclosure, at least the radially outermost corner edges of the stopper ring 22 are rounded as shown in FIG. 4. In this case, when the stopper ring 22 is formed by press working of wire material with the corner edges previously rounded, it is possible to omit post treatment of the stopper ring. Thus, this improves its productivity. In addition, since the width W of the annular groove 21 is set smaller than the free height H0 (see FIG. 5(a)) of the stopper ring 22, the stopper ring 22 can be axially compressed as compared to the non-compressed condition (i.e. free height H0) when it is snapped into the annular groove 21 and occupies a mounted condition (mounted height H1). This makes it possible to apply a predetermined pre-pressure on the sleeve 18. Thus, this surely prevents wear of the housing 2a and the generation of sound or vibration of the actuator.

The electric linear actuator of the present disclosure can be applied to electric linear actuators used in an electric motor for general industries and driving sections of an automobile etc. The electric linear actuators have a ball screw mechanism to convert the rotational input from an electric motor to the linear motion of a driving shaft.

The present disclosure has been described with reference to the preferred embodiment. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. An electric linear actuator comprising:
a cylindrical housing formed of aluminum light alloy;
an electric motor mounted on the housing;
a speed reduction mechanism to reduce the rotational speed of the electric motor via a motor shaft;
a ball screw mechanism to convert the rotational motion of the electric motor to an axial linear motion of a drive shaft via the speed reduction mechanism;
the ball screw mechanism comprising:
a nut formed with a helical screw groove on its inner circumference, the nut is rotationally supported by a pair of supporting bearings mounted on the housing, the nut is axially immovable;
a screw shaft coaxially integrated with the drive shaft, the screw shaft is formed with a helical screw groove on its outer circumference that corresponds to the helical screw groove of the nut, the screw shaft is adapted to be inserted into the nut, via a large number of balls, the screw shaft is non-rotationally supported on the housing but is axially movable;
the housing includes at least a first receiving bore to receive the screw shaft;
a cylindrical sleeve is securely press-fit into the at least first receiving bore of the housing, the sleeve includes one pair of axially extending recessed grooves on its inner circumference at diametrically opposed positions, and a guide pin, mounted on the end of the screw shaft, engages the one pair of axially extending recessed grooves; and
an annular groove is formed near an opening of the at least first receiving bore of the housing, the sleeve is held in the at least first receiving bore by a force directly applied by a stopper ring, the stopper ring is snapped in the annular groove.

2. The electric linear actuator of claim 1, wherein the stopper ring is formed with bent portions, each bent portion having at least one vertex symmetrically positioned around a cut-out portion of the stopper ring.

3. The electric linear actuator of claim 1, wherein the width of the annular groove is set smaller than the free height of the stopper ring.

4. The electric linear actuator of claim 1, wherein at least radially outermost corner edges of the stopper ring are rounded.

5. The electric linear actuator of claim 1, wherein the stopper ring is formed by press working wire material where corner edges are previously rounded.

6. The electric linear actuator of claim 1, wherein the sleeve is formed from sintered alloy that may be carburization quenched.

7. The electric linear actuator of claim 1, wherein the housing is formed by aluminum die casting.

8. The electric linear actuator of claim 1, wherein the guide pin is a needle roller used for needle roller bearings.

* * * * *

UNITED STATES PATENT AND TRADEMARK OFFICE
CERTIFICATE OF CORRECTION

| | |
|---|---|
| PATENT NO. | : 9,574,648 B2 |
| APPLICATION NO. | : 14/461367 |
| DATED | : February 21, 2017 |
| INVENTOR(S) | : Yoshinori Ikeda et al. |

It is certified that error appears in the above-identified patent and that said Letters Patent is hereby corrected as shown below:

In the Specification

<u>Column 7</u>
Line 42          "MS SUS304" should be --JIS SUS304--.

Signed and Sealed this
Second Day of May, 2017

Michelle K. Lee
*Director of the United States Patent and Trademark Office*